US012646715B2

(12) United States Patent
Yun et al.

(10) Patent No.: US 12,646,715 B2
(45) Date of Patent: Jun. 2, 2026

(54) POSITIVE ELECTRODE ACTIVE MATERIAL FOR RECHARGEABLE LITHIUM BATTERY AND RECHARGEABLE LITHIUM BATTERY

(71) Applicant: SAMSUNG SDI CO., LTD, Yongin-si (KR)

(72) Inventors: Pilsang Yun, Yongin-si (KR); Hyunbeom Kim, Yongin-si (KR); Hanseul Lee, Yongin-si (KR); Do-Yu Kim, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 87 days.

(21) Appl. No.: 17/989,547

(22) Filed: Nov. 17, 2022

(65) Prior Publication Data

US 2023/0327101 A1 Oct. 12, 2023

(30) Foreign Application Priority Data

Mar. 23, 2022 (KR) ........................ 10-2022-0036319

(51) Int. Cl.
*H01M 4/525* (2010.01)
*C01G 53/42* (2025.01)
(Continued)

(52) U.S. Cl.
CPC ............ *H01M 4/525* (2013.01); *C01G 53/42* (2013.01); *H01M 4/131* (2013.01); (Continued)

(58) Field of Classification Search
CPC .... H01M 4/1315; H01M 4/525; H01M 4/131; H01M 4/505; H01M 4/1391;
(Continued)

(56) References Cited

U.S. PATENT DOCUMENTS

| | | | | |
|---|---|---|---|---|
| 6,045,771 A * | 4/2000 | Matsubara | ............. | C01G 53/42 429/231.1 |
| 9,559,351 B2 * | 1/2017 | Mori | ..................... | H01M 4/505 |

(Continued)

FOREIGN PATENT DOCUMENTS

| | | |
|---|---|---|
| CN | 102280637 A | 12/2011 |
| JP | 2000-195514 A | 7/2000 |

(Continued)

OTHER PUBLICATIONS

Hwang et al., "Particle size effect of Ni-rich cathode materials on lithium ion battery performance", Materials Research Bulletin vol. 47, Issue 1, Jan. 2012, pp. 73-78, <https://doi.org/10.1016/j.materresbull.2011.10.002> (Year: 2012).*

(Continued)

*Primary Examiner* — Jessie Walls-Murray
(74) *Attorney, Agent, or Firm* — Womble Bond Dickinson (US) LLP

(57) ABSTRACT

A positive electrode active material for a rechargeable lithium battery, and a rechargeable lithium battery including the same are provided. The positive electrode active material includes a lithium nickel-based composite oxide wherein the positive electrode active material is in a form of secondary particles in which a plurality of primary particles are aggregated and at least a portion of the primary particles are radially arranged, in a cross-section of the secondary particles, a number ratio of the primary particles having a cross-sectional area of less than about 0.1 $\mu m^2$ is greater than or equal to about 65%, and a full width at half maximum (FWHM) of the peak corresponding to the (003) plane in the X-ray diffraction analysis for the positive electrode active material is less than or equal to about 0.125.

13 Claims, 13 Drawing Sheets

(51) Int. Cl.
*H01M 4/02* (2006.01)
*H01M 4/131* (2010.01)
*H01M 4/1315* (2010.01)

(52) U.S. Cl.
CPC ....... *H01M 4/1315* (2013.01); *C01P 2002/54* (2013.01); *C01P 2002/60* (2013.01); *C01P 2002/74* (2013.01); *C01P 2004/03* (2013.01); *C01P 2004/50* (2013.01); *C01P 2006/40* (2013.01); *H01M 2004/021* (2013.01); *H01M 2004/028* (2013.01)

(58) Field of Classification Search
CPC ................. H01M 4/364; H01M 4/485; H01M 2004/021; H01M 2004/03; H01M 2004/50; H01M 2002/70; C01P 2002/74; C01P 2004/03; C01P 2004/50; C01P 2002/60; C01P 2002/70
See application file for complete search history.

(56) References Cited

U.S. PATENT DOCUMENTS

| | | | | |
|---|---|---|---|---|
| 10,128,501 | B2 * | 11/2018 | Fukui | C01G 53/50 |
| 2005/0014065 | A1 | 1/2005 | Jung et al. | |
| 2005/0019662 | A1 * | 1/2005 | Suhara | C01G 51/42 429/231.95 |
| 2011/0193013 | A1 | 8/2011 | Paulsen et al. | |
| 2011/0305954 | A1 | 12/2011 | Kim et al. | |
| 2012/0145954 | A1 * | 6/2012 | Endo | C01G 51/50 252/182.1 |
| 2013/0078520 | A1 * | 3/2013 | Toya | C01G 53/00 429/223 |
| 2013/0260248 | A1 | 10/2013 | Seki et al. | |
| 2013/0323606 | A1 | 12/2013 | Yoshida et al. | |
| 2014/0038052 | A1 * | 2/2014 | Song | H01M 4/5815 429/223 |
| 2014/0193714 | A1 | 7/2014 | Kim et al. | |
| 2015/0010819 | A1 | 1/2015 | Lee et al. | |
| 2015/0147653 | A1 | 5/2015 | Nomura et al. | |
| 2015/0194673 | A1 * | 7/2015 | Takagi | H01M 4/505 427/126.6 |
| 2016/0181591 | A1 | 6/2016 | Takahata | |
| 2018/0026268 | A1 * | 1/2018 | Kim | C01G 53/006 429/223 |
| 2019/0074513 | A1 * | 3/2019 | Ham | H01M 10/0525 |
| 2019/0173076 | A1 * | 6/2019 | Kim | H01M 4/0471 |
| 2019/0248673 | A1 | 8/2019 | Kaneda et al. | |
| 2020/0266441 | A1 * | 8/2020 | Yoshihara | H01M 4/0471 |
| 2020/0343551 | A1 | 10/2020 | Cho et al. | |
| 2021/0013505 | A1 | 1/2021 | Toyama et al. | |
| 2021/0135215 | A1 | 5/2021 | Kil | |

FOREIGN PATENT DOCUMENTS

| | | | |
|---|---|---|---|
| JP | 2000-243394 | A | 9/2000 |
| JP | WO2012/124240 | A1 | 9/2012 |
| JP | 2013-206552 | A | 10/2013 |
| JP | 2014-10909 | A | 1/2014 |
| JP | 2014-216264 | A | 11/2014 |
| JP | 2015-103331 | A | 6/2015 |
| JP | 2015-179634 | A | 10/2015 |
| JP | 2016-119269 | A | 6/2016 |
| KR | 10-2005-0010131 | A | 1/2005 |
| KR | 10-2011-0043693 | A | 4/2011 |
| KR | 10-2015-0006283 | A | 1/2015 |
| KR | 10-2015-0059594 | A | 6/2015 |
| KR | 10-2018-0010122 | A | 1/2018 |
| KR | 10-2019-0035717 | A | 4/2019 |
| KR | 10-2007411 | B1 | 10/2019 |
| KR | 10-2020-0125443 | A | 11/2020 |
| KR | 10-2020-0128673 | A | 11/2020 |
| KR | 10-2021-0052320 | A | 5/2021 |

OTHER PUBLICATIONS

Excert and Annotation of Fig. 1B from Xiang Li et al. "Comprehensive study of tantalum doping on morphology, structure, and electrochemical performance of Ni-rich cathode materials" NPL (https://doi.org/10.1016/j.electacta.2021.139653) as cited in the EP Search Report and IDS filed Sep. 21, 2023 (Year: 2022).*

Dixit et al., "Understanding implications of cathode architecture on energy density of solid-state batteries", Energy Storage Materials vol. 40, Sep. 2021, pp. 239-249, <https://doi.org/10.1016/j.ensm.2021.05.001> (Year: 2021).*

Xiang Li et al., "Comprehensive study of tantalum doping on morphology, structure, and electrochemical performance of Ni-rich cathode materials", Electrochimica Acta, Nov. 28, 2022, 13 pages, vol. 403, No. 139653, Elsevier Ltd., Amsterdam, Netherlands.

Extended European Search Report Dated Aug. 28, 2023, of Corresponding EP 22207609.3, 9 Pages.

Korean Office Action in corresponding Korean Application No. 10-2022-0036319, with English translation (5 pgs.), Korean Office Action dated Mar. 12, 2024 (5 pgs.), previously submitted on May 14, 2024.

Chinese Office Action dated Mar. 13, 2026, of the corresponding Chinese Patent Application No. 202211476529.1, 9 pages.

* cited by examiner

POSITIVE ELECTRODE ACTIVE MATERIAL FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2022-0036319, filed in the Korean Intellectual Property Office on Mar. 23, 2022, the entire content of which is incorporated herein by reference.

BACKGROUND

1. Field

A positive electrode active material for a rechargeable lithium battery and a rechargeable lithium battery including the same are disclosed.

2. Description of the Related Art

A portable information device (such as a cell phone, a laptop, a smart phone, and/or the like) and/or an electric vehicle has utilized a rechargeable lithium battery having high energy density and easy portability as a driving power source. Recently, research has been actively conducted to utilize a rechargeable lithium battery with high energy density as a driving power source or a power storage power source for hybrid or electric vehicles.

As a positive electrode active material for a rechargeable lithium battery, a lithium nickel-based oxide such as a lithium nickel manganese cobalt composite oxide, a lithium cobalt oxide, and/or the like is utilized. When such a positive electrode active material is utilized, a long-term cycle-life of the positive electrode active material may decrease, a resistance thereof may increase, and capacity characteristics may not reach a satisfactory level due to cracks generated in the positive electrode active material as charging and discharging are repeated, and thus improvement is desired or required.

SUMMARY

One or more aspects according to embodiments of the present disclosure are directed toward a positive electrode active material for a rechargeable lithium battery having high initial charge/discharge efficiency, high capacity realization, and high-rate charging capacity, which has improved high-speed charging characteristics, and a rechargeable lithium battery including the same. Additional aspects will be set forth in part in the description which follows and, in part, will be apparent from the description, or may be learned by practice of the presented embodiments.

In an embodiment, a positive electrode active material for a rechargeable lithium battery includes a lithium nickel-based composite oxide, wherein the positive electrode active material is in a form of secondary particles including (i.e., the positive electrode active material includes) a secondary particle in which a plurality of primary particles are aggregated and at least a portion of the primary particles are radially arranged, in a cross-section of the secondary particle, a number ratio of the primary particles having a cross-sectional area of less than about 0.1 $\mu m^2$ is greater than or equal to about 65%, and a full width at half maximum (FWHM) of a peak corresponding to the (003) plane in an X-ray diffraction analysis for the positive electrode active material is less than or equal to about 0.125.

In another embodiment, a rechargeable lithium battery including a positive electrode including the aforementioned positive electrode active material, a negative electrode, and an electrolyte.

The positive electrode active material and the rechargeable lithium battery including the same according to embodiments have high initial charge/discharge efficiency to realize high capacity, and also have high-rate charge/discharge capacity, and thus have excellent or suitable high-speed charging characteristics.

DETAILED DESCRIPTION

Figure 1:
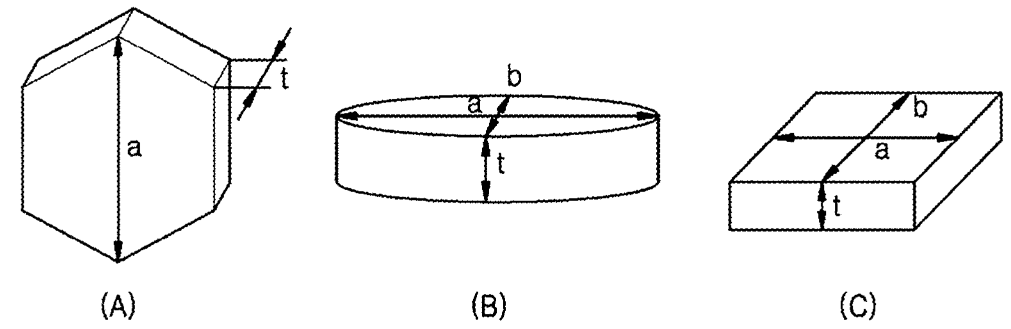
FIG. 1 is a schematic view showing the shape of plate-shaped primary particles.

Hereinafter, specific embodiments will be described in more detail so that those of ordinary skill in the art can easily implement them. However, this disclosure may be embodied in many different forms and should not be construed as limited to the example embodiments set forth herein.

The terminology used herein is used to describe embodiments only, and is not intended to limit the present disclosure. The singular expression includes the plural expression unless the context clearly dictates otherwise.

As used herein, the term "combination thereof" refers to a mixture, laminate, composite, copolymer, alloy, blend, reaction product, and/or the like of the constituents.

It should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., may be exaggerated for clarity and like reference numerals designate like elements throughout the specification, and duplicative descriptions thereof may not be provided. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, the term "layer" as used herein includes not only a shape formed on the whole surface when viewed from a plan view, but also a shape formed on a partial surface.

In addition, the average particle diameter and the average size may be measured by a suitable method (e.g., well known to those skilled in the art), for example, may be measured by a particle size analyzer, or may be measured by a transmission electron microscopic image or a scanning electron microscopic image. Alternatively, it is possible to obtain an average particle diameter value by measuring a size utilizing a dynamic light scattering method, performing data analysis, counting the number of particles for each particle size range, and calculating the average particle diameter from this. Unless otherwise defined, the average particle diameter may refer to the diameter (D50) of particles having a cumulative volume of 50 volume % in a particle size distribution curve as measured by a particle size analyzer.

In the present specification, when particles are spherical, "diameter" indicates a particle diameter or an average particle diameter, and when the particles are non-spherical, the "diameter" indicates a major axis length or an average major axis length.

Also, the term "or" as used herein is not to be construed as an exclusive meaning, for example, "A or B" is construed to include A, B, A+B, and/or the like.

Positive Electrode Active Material

In an embodiment, a positive electrode active material includes a lithium nickel-based composite oxide, wherein the positive electrode active material is in a form of secondary particles (e.g., a plurality of secondary particles) in which (e.g., in which each of which) a plurality of primary particles are aggregated and at least a portion of the primary particles are radially arranged, in a cross-section of the respective one of the secondary particles, a number ratio of the primary particles having a cross-sectional area of less than about 0.1 $\mu m^2$ is greater than or equal to about 65%, and a full width at half maximum of the (003) plane peak ($FWHM_{003}$) in an X-ray diffraction analysis for the positive electrode active material is less than or equal to 0.125. The positive electrode active material may maximize or increase initial charge/discharge efficiency due to structural characteristics, and may improve high-speed charging characteristics due to high high-rate charge/discharge capacity.

The secondary particle may include plate-shaped primary particles. FIG. 1 is a schematic view showing plate-shaped primary particles. Referring to FIG. 1, the primary particles may have one or more suitable detailed shapes while having a basic plate structure, such as (A) a polygonal nanoplate shape such as a hexagon, (B) a nano disk shape, and/or (C) a rectangular parallelepiped shape.

In FIG. 1, "a" refers to a length of a long axis of the primary particle, "b" refers to a length of a short axis, and "t" refers to a thickness. Here, the length (a) of the long axis refers to a maximum length with respect to the widest surface of the primary particle. The thickness (t) may be a maximum length of a surface that is approximately perpendicular to the widest surface of the primary particle. A direction containing the length (a) of the long axis and the length (b) of the short axis is defined as a plane direction, and a direction in which the thickness (t) is defined is defined as a thickness direction. For example, a direction that is parallel to the plane formed by the long axis and the short axis is a plane direction.

The thickness (t) of the primary particles may be smaller than the length (a) of the long axis and the length (b) of the short axis, which are lengths in the plane direction. The length (a) of the long axis from among the lengths in the plane direction may be longer or the same as the length (b) of the short axis.

Figure 2:
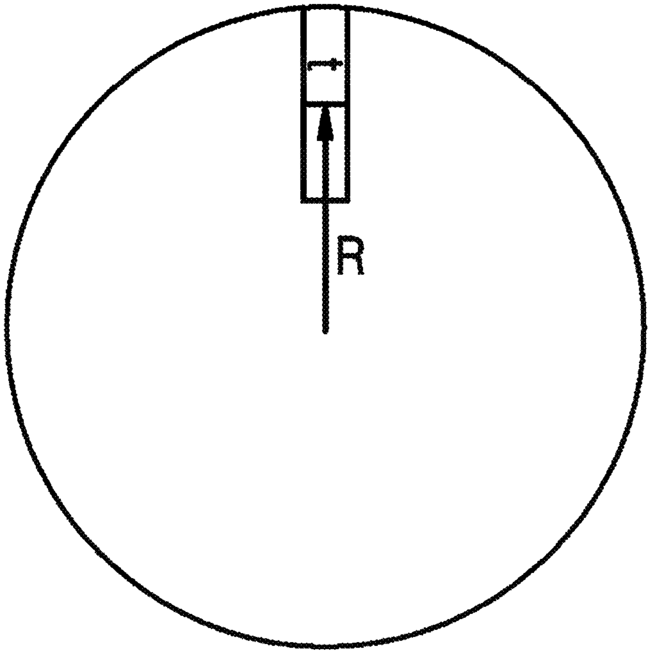
FIG. 2 is a schematic view for explaining the definition of a radial arranged structure in secondary particles.

In the positive electrode active material, at least a portion of the primary particles may have a radially arranged structure, and for example, the long axes of the primary particles may be arranged in a radial direction. FIG. 2 is a schematic view for explaining the definition of a radial arranged structure in a secondary particle according to an embodiment. In an embodiment, the radially arranged structure refers to that, as shown in FIG. 2, the thickness (t) direction of the primary particle(s) is perpendicular to or within an angle of about ±5° of the line perpendicular to the direction (R) of the secondary particle from the center of the secondary particle to the surface (e.g., the outmost surface of the secondary particle).

In this way, when at least a portion of the primary particles are radially arranged, because the secondary particles have lots of crystal planes (through which lithium is transmitted to the outside) that are exposed to the surface and pores (which serve as a lithium diffusion passage and are also exposed onto the surface), lithium diffusion may be improved, securing high initial efficiency and high capacity. In some embodiments, the pores exposed to the surface of the secondary particles are directed toward a center of the secondary particles (e.g., the center of each secondary particle), which further promotes the lithium diffusion.

Due to the radially arranged primary particles, substantially uniform contraction and expansion of the positive electrode active material are possible when lithium is deintercalated and/or intercalated, and when lithium is deintercalated, more pores exist in the (001) direction, which is the direction in which the particles expand, so that they act as a buffer. Accordingly, the probability of cracks occurring during contraction and expansion of the positive electrode active material is lowered, and the internal pores further mitigate the volume change, thereby reducing the generation of cracks between primary particles during charging and discharging. Accordingly, cycle-life characteristics of the rechargeable lithium battery may be improved and an increase in resistance may be reduced.

In the positive electrode active material according to an embodiment, at least a portion of the primary particles are radially arranged, and concurrently (e.g., simultaneously), in the cross-section of the secondary particles, the number of the primary particles having a cross-sectional area of less than about 0.1 $\mu m^2$ satisfies a ratio of about 65% or more. That is, concurrently (e.g., simultaneously), the number of the primary particles having a cross-sectional area of less than about 0.1 $\mu m^2$ is about 65% or more based on the total number of primary particles in the cross-section of the secondary particle. In general, the lithium diffusion is much slower from the surface of the primary particles to the inner portion than along the boundaries between the primary particles on the surface of the secondary particles. Accordingly, in an embodiment, by reducing the size of the primary particles, slower diffusion within the primary particles is reduced, and faster diffusion at boundaries between the primary particles is increased (e.g., more boundaries are created).

This positive electrode active material is advantageous in rate characteristics due to the easy (e.g., enhanced) lithium diffusion, and a rechargeable lithium battery manufactured by applying the same exhibits improved initial charge and discharge capacity and efficiency, thereby securing high-rate charging capacity and shortening high-speed charging time.

In a cross-section of the secondary particle of the positive electrode active material, a number ratio (e.g., percentage based on the total number of primary particles in the cross-section of the secondary particle) of the primary particles having a cross-sectional area of less than about 0.1 $\mu m^2$ may be, for example about 65% to about 90%, for example about 70% to about 85%.

In some embodiments, in the cross-section of the secondary particle, a number ratio (e.g., percentage based on the total number of primary particles in the cross-section of the secondary particle) of the primary particles having a cross-sectional area of greater than about 0.3 $\mu m^2$ may be less than or equal to about 5%, for example about 0.1% to about 5%, or about 0.1% to about 4%.

In the cross-section of the secondary particle, a number ratio (e.g., percentage based on the total number of primary particles in the cross-section of the secondary particle) of the primary particles having a cross-sectional area of about 0.1 $\mu m^2$ to about 0.3 $\mu m^2$ may be about 5% to about 30%, for example about 11% to about 29.9%, or about 15% to about 29%.

When the primary particles constituting the secondary particles of the positive electrode active material exhibits such a cross-sectional area distribution, the positive electrode active material has a reduced lithium ion diffusion distance, thereby improving high-rate charge/discharge capacity, initial charge/discharge efficiency, and/or the like.

The positive electrode active material satisfies the cross-sectional area distribution of the primary particles and concurrently (e.g., simultaneously), a full width at half maximum of the peak corresponding to the (003) plane ($FWHM_{003}$) of less than or equal to about 0.125 in the X-ray diffraction analysis. $FWHM_{003}$ may be, for example, about 0.100 to about 0.125, about 0.110 to about 0.125, or about 0.100 to about 0.124.

When the secondary particles of the positive electrode active material may be described as a structure in which the (003) planes of the primary particles are oriented perpendicular to the surface (e.g., outmost surface) of the secondary particles, wherein the primary particles satisfy the aforementioned area distribution and also, a peak full width at half maximum (FWHM) of the (003) plane of less than or equal to about 0.125, the (003) planes are sufficiently aligned to maximize or increase capacity, and concurrently (e.g., simultaneously), enhance diffusion of lithium ions, thereby increasing initial charge/discharge efficiency and high-rate charge/discharge capacity, and in addition, cycle-life characteristics may be improved by minimizing or reducing a stress according to contraction and expansion of the positive electrode active material.

The secondary particles of the positive electrode active material may include, for example, an inner portion having an irregular porous structure and an outer portion having a structure that at least a portion of the primary particles are radially arranged, that is, a radially arranged structure. The irregular porous structure is a structure having the primary particles and pores, wherein a size, a shape, a position, and/or the like of the primary particles are irregular. In this inner portion, the primary particles may be arranged without regularity, unlike the outer portion.

Figure 3:
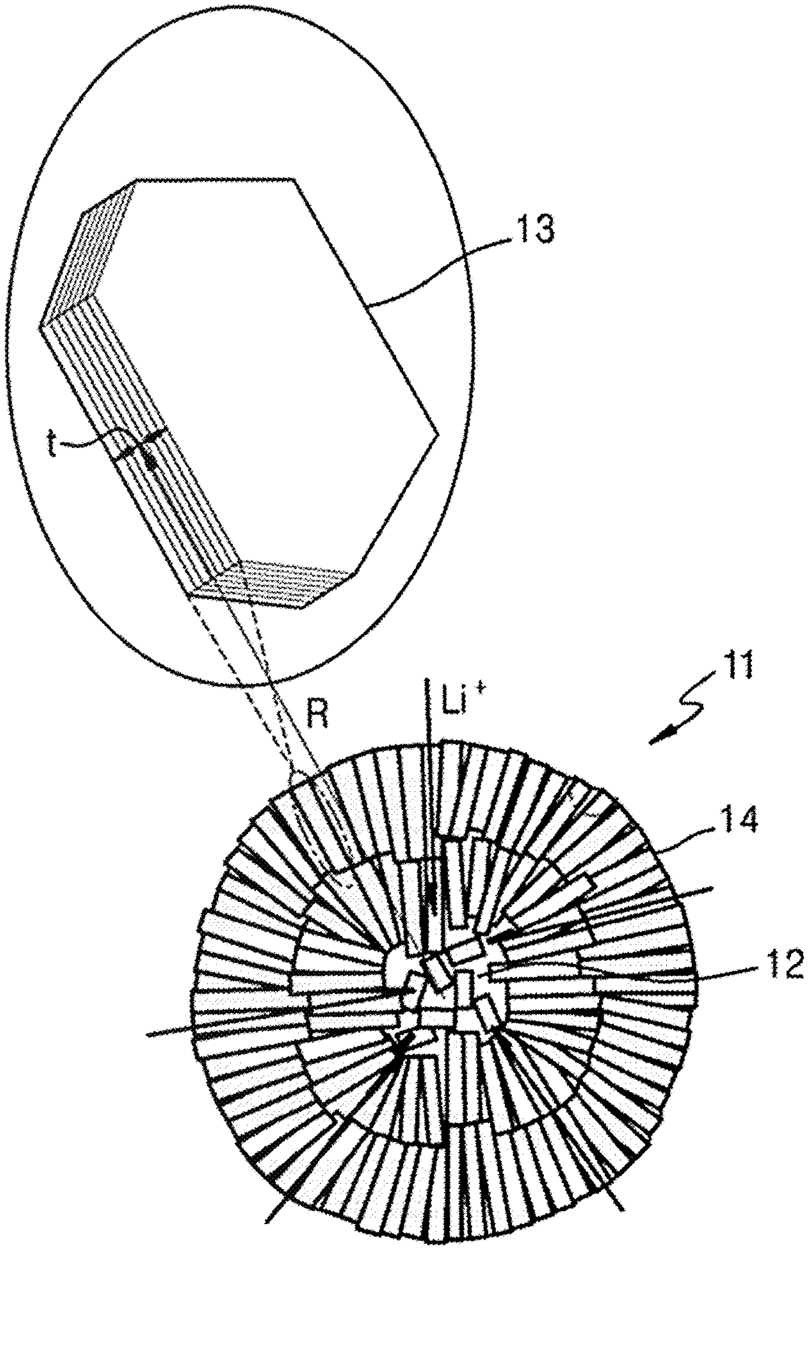
FIG. 3 is a schematic view showing a cross-sectional structure of a secondary particle.

FIG. 3 is a schematic view showing a cross-sectional structure of the secondary particle of the positive electrode active material. Referring to FIG. 3, the secondary particle 11 (of the plurality of secondary particles 11) of the positive electrode active material has an outer portion 14 having a structure in which the plate-shaped primary particles 13 are arranged in a radial direction, and an inner portion 12 in which the primary particles 13 are irregularly arranged. In the inner portion 12, there may be more empty spaces between the primary particles than in the outer portion. In some embodiments, a pore size and porosity of the inner portion may be larger and more irregular compared with those of the outer portion. In FIG. 3, the arrows each indicate a movement direction of lithium ions.

The positive electrode active material with this structure has a porous structure in the inner portion, so that a diffusion distance of lithium ions to the inner portion is reduced, and the pores may have an effect of alleviating volume changes between the primary particles occurring during the charge and discharge. In addition, in the positive electrode active material, the primary particles in the outer portion are radially arranged, so lithium ions may be easily intercalated into the surface, and a stress according to the volume changes may be minimized or reduced during the charge and discharge. This positive electrode active material may reduce resistance of a rechargeable lithium battery and improve charge and discharge efficiency and cycle-life characteristics thereof.

In the secondary particles of the positive electrode active material, the inner portion may include pores with a larger size than those in the outer portion. For example, the pores in the inner portion may have a size of about 150 nm to about 1 μm, and the pores in the outer portion may have a size of less than about 150 nm. When the pores satisfy the above respective size ranges, in the outer portion, lithium ions may be easily intercalated, while in the inner portion, a lithium diffusion distance may be shorter, and thereby alleviating the volume changes of the positive electrode active material during the charge and discharge. Here, the size of the pore may refer to a diameter, when the pore is spherical or circular, or a length of a long axis when the pore is oval and/or the like, wherein the size is measured with a microscope such as SEM and/or the like.

In some embodiments, the secondary particles of the positive electrode active material may have open pores on the surface (e.g., the outmost surface of the secondary particles). The open pores may be pores of which a portion of walls (e.g., the pore walls) are not closed, and the open pores on the surface may be connected to the outside and work as a passage through which a material comes in and out. These open pores may have a size of less than about 150 nm, for example, about 10 nm to about 148 nm. Because the primary particles in the outer portion of the secondary particles are radially arranged, the open pores on the surface may be in the form of facing the center of the secondary particles (e.g., the center of each secondary particle) from the surface of the secondary particles. The open pores may be formed to a depth of less than or equal to about 150 nm, for example, about 0.1 nm to about 100 nm, for example, about 1 nm to about 50 nm from the surface of the secondary particle. The size and depth of the open pores may be measured by the BJH (Barrett, Joyner and Halenda) method, which is a method derived through the adsorption or desorption content (e.g., amount) of nitrogen.

The closed pores may exist in the inner portion of the secondary particle, and the closed pores and/or open pores may exist in the outer portion. The closed pores may exclude or mostly exclude an electrolyte, while the open pores may include an electrolyte therein. The closed pores may be referred to as independent pores that are not connected to other pores because all of the walls of the pores are formed in a closed structure.

In an embodiment, the inner portion to a total of the secondary particles may have a radius ratio of (e.g., a radius ratio between a radius of the inner portion and a radius of the whole secondary particle may be) about 45% to about 65%, for example, about 45% to about 60%, about 50% to about 60%, or about 50% to about 55%. When the radius ratio of the outer portion of the secondary particles satisfies the above ranges, initial charge/discharge efficiency and high temperature cycle-life characteristics may be improved.

In some embodiments, the outer portion to the total of the secondary particle may have a volume ratio of (e.g., a volume ratio between the volume of the outer portion and the volume of the whole secondary particle may be) less than or equal to about 87%, for example, less than or equal to about 85%, about 80% to about 87%, or about 80% to about 85%. When the volume ratio of the outer portion of the secondary particles satisfies the above ranges, initial charge/discharge efficiency and high temperature cycle-life characteristics may be further improved.

In some embodiments, the average particle diameter (D50) of the secondary particles of the positive electrode active material may be about 5 μm to about 20 μm, for example, about 8 μm to about 18 μm, or about 10 μm to about 15 μm. When the average particle diameter (D50) of the secondary particles satisfies the above ranges, the positive electrode active material may realize high capacity and exhibit high initial charge/discharge efficiency and cycle-life characteristics. The average particle diameter (D50) of the secondary particles may be measured in a laser diffraction method by dispersing the positive electrode active material with a dispersing agent in distilled water. Alternatively, a scanning electron microscope and/or the like may be utilized to take an electron microscope image of the surface or the cross-section of the secondary particles. Here, the electron microscope may be utilized to measure about 30 particle diameters and thus obtain a particle size distribution, wherein a particle diameter D50 at a cumulative volume of 50 volume % is obtained as the average particle diameter.

The lithium nickel-based composite oxide may be represented by Chemical Formula 1.

$$Li_{a1}Ni_{x1}M^1_{y1}M^2_{1-x1-y1}O_{2-z}X_z \quad \text{Chemical Formula 1}$$

In Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ may each independently be at least one element selected from aluminum (Al), boron (B), barium (Ba), calcium (Ca), cerium (Ce), cobalt (Co), chromium (Cr), iron (Fe), magnesium (Mg), manganese (Mn), molybdenum (Mo), niobium (Nb), silicon (Si), strontium (Sr), titanium (Ti), vanadium (V), tungsten (W), and zirconium (Zr), and X is at least one element selected from fluorine (F), phosphorous (P), and sulfur (S).

In some embodiments, in Chemical Formula 1, $0.4 \leq x1 \leq 1$ and $0 \leq y1 \leq 0.6$, $0.5 \leq x1 \leq 1$ and $0 \leq y1 \leq 0.5$, $0.6 \leq x1 \leq 1$ and $0 \leq y1 \leq 0.4$, or $0.7 \leq x1 \leq 1$ and $0 \leq y1 \leq 0.3$, $0.8 \leq x1 \leq 1$ and $0 \leq y1 \leq 0.2$, or $0.9 \leq x1 \leq 1$ and $0 \leq y1 \leq 0.1$.

The lithium nickel-based composite oxide may be, for example, represented by Chemical Formula 2.

$$Li_{a2}Ni_{x2}CO_{y2}M^3_{1-x2-y2}O_{2-z}X_z \quad \text{Chemical Formula 2}$$

In Chemical Formula 2, $0.9 \leq a2 \leq 1.8$, $0.3 \leq x2 \leq 1$, $0 \leq y2 \leq 0.7$, and $0 \leq z \leq 0.1$, $M^3$ is at least one element selected from Al, B, Ba, Ca, Ce, Cr, Fe, Mg, Mn, Mo, Nb, Si, Sr, Ti, V, W, and Zr, and X is at least one element selected from F, P, and S.

In some embodiments, in Chemical Formula 2, $0.3 \leq x2 \leq 0.99$ and $0.01 \leq y2 \leq 0.7$, $0.4 \leq x2 \leq 0.99$ and $0.01 \leq y2 \leq 0.6$, $0.5 \leq x2 \leq 0.99$ and $0.01 \leq y2 \leq 0.5$, or $0.6 \leq x2 \leq 0.99$ and $0.01 \leq y2 \leq 0.4$, $0.7 \leq x2 \leq 0.99$ and $0.01 \leq y2 \leq 0.3$, $0.8 \leq x2 \leq 0.99$ and $0.01 \leq y2 \leq 0.2$, or $0.9 \leq x2 \leq 0.99$ and $0.01 \leq y2 \leq 0.1$.

The lithium nickel-based composite oxide may be, for example, represented by Chemical Formula 3.

$$Li_{a3}Ni_{x3}CO_{y3}M^4_{z3}M^5_{1-x3-y3-z3}O_{2-z}X_z \quad \text{Chemical Formula 3}$$

In Chemical Formula 3, $0.9 \leq a3 \leq 1.8$, $0.3 \leq x3 \leq 0.98$, $0.01 \leq y3 \leq 0.69$, $0.01 \leq z3 \leq 0.69$, and $0 \leq z \leq 0.1$, $M^4$ is at least one element selected from Al, and Mn, $M^5$ is at least one element selected from B, Ba, Ca, Ce, Cr, Fe, Mg, Mo, Nb, Si, Sr, Ti, V, W, and Zr, and X is at least one element selected from F, P, and S.

In some embodiments, in Chemical Formula 3, $0.4 \leq x3 \leq 0.98$, $0.01 \leq y3 \leq 0.59$, and $0.01 \leq z3 \leq 0.59$, may be $0.5 \leq x3 \leq 0.98$, $0.01 \leq y3 \leq 0.49$, and $0.01 \leq z3 \leq 0.49$, or $0.6 \leq x3 \leq 0.98$, $0.01 \leq y3 \leq 0.39$, and $0.01 \leq z3 \leq 0.39$, or $0.7 \leq x3 \leq 0.98$, $0.01 \leq y3 \leq 0.29$, and $0.01 \leq z3 \leq 0.29$, or $0.8 \leq x3 \leq 0.98$, $0.01 \leq y3 \leq 0.19$, and $0.01 \leq z3 \leq 0.19$, or $0.9 \leq x3 \leq 0.98$, $0.01 \leq y3 \leq 0.09$, and $0.01 \leq z3 \leq 0.09$.

Method for Preparing Positive Electrode Active Material

In an embodiment, a method of preparing a positive electrode active material for a rechargeable lithium battery includes mixing a positive electrode active material precursor including a nickel-based composite hydroxide and a lithium raw material, and heat-treating the resultant mixture.

The positive electrode active material precursor may be prepared by a coprecipitation method. For example, a nickel raw material and optionally, a metal raw material other than the nickel may be mixed to prepare a composite metal raw material, and then, a complexing agent and a pH controlling agent may be added thereto to control the pH of the mixture and perform a co-precipitation reaction, thereby preparing a nickel-based composite hydroxide having a desired or suitable composition.

The complexing agent serves to control a reaction rate of the formation of a precipitate in the co-precipitation reaction, and may be, for example, ammonium hydroxide (NHOH), ammonium sulfate, and/or citric acid.

The pH controlling agent may be, for example, sodium hydroxide (NaOH), sodium carbonate ($Na_2CO_3$), sodium oxalate ($Na_2C_2O_4$), and/or the like. The pH of the mixture may be adjusted, for example, to the range of about 10 to about 13.

The co-precipitation reaction may proceed in several steps, for example, 2 steps, 3 steps, or 4 steps. In each step, a concentration of the complexing agent, an input rate of the composite metal raw material, the pH range, a reaction temperature, reaction time, stirring power, and/or the like may be differently adjusted. Through these adjustments, a secondary particle-type or kind positive electrode active material precursor (e.g., a positive electrode active material precursor in the form of secondary particles), in which at least a portion of the primary particles are radially arranged, is prepared, and in addition, secondary particles having different internal and external shapes are prepared.

In an embodiment, the positive electrode active material precursor including a nickel-based composite hydroxide is prepared through each first, second, and third step process of forming a core, an intermediate layer, and a shell.

In the first step, a complex agent and a pH controlling agent are put in a reactor, and metal raw materials are added thereto and reacted, the complex agent may have a concentration of 0.1 M to 0.7 M, the input amount of the complex agent may be in a range of 6 mL/min to 12 mL/min, the metal raw materials may have concentrations of 0.1 M to 3.5 M, the input amounts of the metal raw materials may be in a range of 50 ml/min to 100 ml/min.

In the second step, the metal raw materials and the complex agent are added to a resulting material of the first step reaction to control pH of the reaction mixture, and then, a reaction of the second step is performed, a concentration of the complex agent may be 0.3 M to 1.0 M, the input amount of the complex agent may be in a range of 8 ml/min to 15 ml/min, the metal raw materials may have concentrations of 0.1 M to 3.5 M, the input amounts of the metal raw materials may be in a range of 90 ml/min to 120 ml/min.

In the third step, the input amounts and the concentrations of the metal raw materials and the complex agent may be increased in order to prevent a growth rate decrease of particles after reacting a reaction product from the second step for a predetermined time, the concentration of the complex agent may be in a range of 0.35 M to 1.0 M, the input amount of the complex agent may be in a range of 12 ml/min to 20 ml/min, the metal raw materials may have concentrations of 0.1 M to 3.5 M, the input amounts of the metal raw materials may be in a range of 120 ml/min to 150 ml/min.

In the first step, the second step, and the third step, the pH of the reaction mixture may be adjusted in a range of 10 to 12.

The nickel-based composite hydroxide may be, for example, represented by Chemical Formula 11.

$Ni_{x11}M^{11}_{y11}M^{12}_{1-x11-y11}(OH)_2$ Chemical Formula 11

In Chemical Formula 11, $0.3 \le x11 \le 1$, $0 \le y11 \le 0.7$, and $M^{11}$ and $M^{12}$ may each independently be selected from Al, B, Ba, Ca, Ce, Co, Cr, F, Fe, Mg, Mn, Mo, Nb, P, S, Si, Sr, Ti, V, W, Zr, and a combination thereof.

As an example, the nickel-based composite hydroxide may be represented by Chemical Formula 12 or Chemical Formula 13.

$Ni_{x12}CO_{y12}M^{13}_{1-x12-y12}(OH)_2$ Chemical Formula 12

In Chemical Formula 12, $0.3 \le x12 < 1$, $0 < y12 \le 0.7$, and $M^{13}$ is selected from Al, B, Ba, Ca, Ce, Cr, F, Fe, Mg, Mn, Mo, Nb, P, S, Si, Sr, Ti, V, W, Zr, and a combination thereof.

$Ni_{x13}CO_{y13}M^{14}_{z13}M^{15}_{1-x13-y13-z13}(OH)_2$ Chemical Formula 13

In Chemical Formula 13, $0.3 \le x13 \le 0.98$, $0.01 \le y13 \le 0.69$, $0.01 \le z13 \le 0.69$, $M^{14}$ is selected from Al, Mn, and a combination thereof, and $M^{15}$ is selected from B, Ba, Ca, Ce, Cr, F, Fe, Mg, Mo, Nb, P, S, Si, Sr, Ti, V, W, Zr, and a combination thereof.

The average particle diameter (D50) of the positive electrode active material precursor may be, for example, about 5 μm to about 25 μm, or about 8 μm to about 20 μm. Here, the particle diameter of the secondary particles (e.g., of the positive electrode active material precursor) may be measured by an optical or electron microscopic image such as a scanning electron microscope on the surface or cross-section of the secondary particles of the positive electrode active material precursor. A particle size distribution is obtained by measuring about 30 particle diameters through an optical or electron microscope, and the D50 value, which is the particle diameter at a point where the cumulative volume is about 50 volume %, may be taken as the average particle diameter.

The aforementioned positive electrode active material may be obtained by mixing the lithium raw material with the prepared positive electrode active material precursor and then performing a heat-treatment.

The lithium raw material may be, for example, $Li_2CO_3$, LiOH, a hydrate thereof, or a combination thereof, and may be mixed in a ratio (e.g., amount) of about 0.8 mole to about 1.8 mole, or about 0.9 mole to about 1.2 mole with respect to 1 mole of the nickel-based composite hydroxide (or the nickel-based composite hydroxide precursor).

The heat-treatment may be performed, for example, at about 600° C. to about 900° C. or about 600° C. to about 800° C.

In an embodiment, the heat-treatment may include a temperature-raising step and a temperature-maintaining step, wherein the temperature-raising time (e.g., time duration in the temperature-raising step) may be longer than the temperature-maintaining time (e.g., time duration in the temperature-maintaining step). For example, the temperature-raising time may be about 6 hours to about 16 hours, and the temperature-maintaining time may be about 1 hour to about 9 hours, wherein the temperature-raising time may be longer than the temperature-maintaining time.

In the heat-treatment, the temperature-raising time may be, for example, about 6 hours to about 15 hours, about 6 hours to about 14 hours, about 6 hours to about 13 hours, or about 7 hours to about 12 hours, and the temperature-maintaining time may be about 2 hours to about 9 hours or about 3 hours to about 8 hours.

In some embodiments, a ratio of (temperature-raising time):(temperature-maintaining time) may be about 1.1:1 to about 10:1, for example, about 1.1:1 to about 8:1, about 1.1:1 to about 6:1, about 1.1:1 to about 5:1, or about 1.1:1 to about 4:1.

When the ratio of (temperature-raising time):(temperature-maintaining time) is within the above ranges, the heat-treatment profile may be adjusted to effectively control the primary particle cross-sectional area distribution and the peak full width at half maximum (FWHM) range of the (003) plane.

Positive Electrode

The positive electrode for a rechargeable lithium battery may include a current collector and a positive electrode active material layer on the current collector. The positive electrode active material layer may include a positive electrode active material, and may further include a binder and/or a conductive material.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the present disclosure is not limited thereto.

The content (e.g., amount) of the binder in the positive electrode active material layer may be about 1 wt % to about 5 wt % based on the total weight of the positive electrode active material layer.

The conductive material is included to provide electrode conductivity. Any suitable electrically conductive material may be utilized as the conductive material unless it causes a chemical change. Examples of the conductive material may include a carbon-based material such as natural graphite, artificial graphite, carbon black, acetylene black, ketjen black, a carbon fiber, carbon nanotube, and/or the like; a metal-based material of a metal powder and/or a metal fiber including copper, nickel, aluminum, silver, and/or the like; a conductive polymer such as a polyphenylene derivative; or a mixture thereof.

The content (e.g., amount) of the conductive material in the positive electrode active material layer may be about 1 wt % to about 5 wt % based on the total weight of the positive electrode active material layer.

An aluminum foil may be utilized as the positive electrode current collector, but the present disclosure is not limited thereto.

Negative Electrode

The negative electrode for a rechargeable lithium battery includes a current collector and a negative electrode active material layer on the current collector. The negative electrode active material layer includes a negative electrode active material and may further include a binder and/or a conductive material.

The negative electrode active material may include a material capable of reversibly intercalating/deintercalating lithium ions, a lithium metal, a lithium metal alloy, a material capable of doping/dedoping lithium, and/or transition metal oxide.

The material that is capable of reversibly intercalating/deintercalating lithium ions may include, for example crystalline carbon, amorphous carbon, or a combination thereof as a carbon-based negative electrode active material. The crystalline carbon may be irregular-shaped, or sheet, flake, spherical, or fiber shaped natural graphite and/or artificial graphite. The amorphous carbon may be a soft carbon, a hard carbon, a mesophase pitch carbonization product, calcined coke, and/or the like.

The lithium metal alloy includes an alloy of lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative electrode active material or a Sn-based negative electrode active material. The Si-based negative electrode active material may include silicon, a silicon-carbon composite, $SiO_x$ ($0<x<2$), a Si-Q alloy (wherein Q is an alkali metal, an alkaline-earth metal, a Group 13 element, a Group 14 element excluding Si, a Group 15 element, a Group 16 element, a transition metal, a rare earth element, and a combination thereof) and the Sn-based negative electrode active material may include Sn, $SnO_2$, a Sn—R alloy (wherein R is an alkali metal, an alkaline-earth metal, a Group 13 element, a Group 14 element excluding Sn, a Group 15 element, a Group 16 element, a transition metal, a rare earth element, and a combination thereof). At least one of these materials may be mixed with $SiO_2$. The elements Q and R may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorous (P), arsenic (As), antimony (Sb), bismuth (Bi), sulfur (S), selenium (Se), tellurium (Te), polonium (Po), and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, and/or a polymer resin such as a phenol resin, a furan resin, and/or a polyimide resin. The content (e.g., amount) of silicon may be about 10 wt % to about 50 wt % based on the total weight of the silicon-carbon composite. In some embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. In some embodiments, the average particle diameter (D50) of the silicon particles may be about 10 nm to about 200 nm. The silicon particles may exist in an oxidized form, and in this case, a content (e.g., amount) ratio of Si:O in the silicon particles, indicating a degree of oxidation, may be a weight ratio of about 99:1 to about 33:67. The silicon particles may be $SiO_x$ particles, and the range of x in $SiO_x$ may be greater than about 0 and less than about 2. The average particle diameter (D50) is measured by a particle size analyzer and refers to a diameter of particles having a cumulative volume of 50 volume % in the particle size distribution.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and utilized, the mixing ratio may be a weight ratio of about 1:99 to about 90:10.

In the negative electrode active material layer, the negative electrode active material may be included in an amount of about 95 wt % to about 99 wt % based on the total weight of the negative electrode active material layer.

In an embodiment, the negative electrode active material layer further includes a binder, and may optionally further include a conductive material. The content (e.g., amount) of the binder in the negative electrode active material layer may be about 1 wt % to about 5 wt % based on the total weight of the negative electrode active material layer. In some embodiments, when the conductive material is further included, the negative electrode active material layer may include about 90 wt % to about 98 wt % of the negative electrode active material, about 1 wt % to about 5 wt % of the binder, and about 1 wt % to about 5 wt % of the conductive material.

The binder serves to well adhere the negative electrode active material particles to each other and also to adhere the negative electrode active material to the current collector. The binder may be a water-insoluble binder, a water-soluble binder, or a combination thereof.

Examples of the water-insoluble binder may include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is utilized as the negative electrode binder, a cellulose-based compound capable of imparting viscosity as a thickener may be further included. As the cellulose-based compound, one or more of carboxymethyl cellulose, hydroxypropylmethyl cellulose, methyl cellulose, and/or alkali metal salts thereof may be mixed and utilized. As the alkali metal, Na, K and/or Li may be utilized. The amount of the thickener utilized may be about 0.1 parts by weight to about 3 parts by weight based on 100 parts by weight of the negative electrode active material.

The conductive material is included to provide electrode conductivity. Any suitable electrically conductive material may be utilized as a conductive material unless it causes a chemical change. Examples of the conductive material may include a carbon-based material such as natural graphite, artificial graphite, carbon black, acetylene black, ketjen black, a carbon fiber, carbon nanotube, and/or the like; a metal-based material of a metal powder or a metal fiber including copper, nickel, aluminum silver, and/or the like; a conductive polymer such as a polyphenylene derivative; or a mixture thereof.

The negative electrode current collector may include one selected from a copper foil, a nickel foil, a stainless steel foil, a titanium foil, a nickel foam, a copper foam, a polymer substrate coated with a conductive metal, and a combination thereof.

Rechargeable Lithium Battery

Another embodiment provides a rechargeable lithium battery including a positive electrode, a negative electrode, and an electrolyte.

The rechargeable lithium battery may include, for example, a positive electrode, a negative electrode, a separator between the positive electrode and the negative electrode, and an electrolyte, wherein the electrolyte may be in the form of a liquid or a gel polymer. As another example, the rechargeable lithium battery may be an all-solid-state battery including a positive electrode, a negative electrode, and a solid electrolyte, or a semi-solid battery including a positive electrode, a negative electrode, and a semi-solid electrolyte. The term "semi-solid" as used herein may refer to a state including both (e.g., simultaneously) a solid component and a liquid component, or a state in which most of the solid component is included (e.g., the majority are solid components) but a portion (e.g., a minor portion) of the liquid component is also included. The all-solid-state battery and the semi-solid battery may not include (e.g., may exclude) a separator. The positive electrode active material according to an embodiment can realize very high charge/discharge efficiency and high temperature cycle-life while realizing a high capacity due to its shape, so it is suitable for application to the aforementioned types (kinds) of batteries and exhibits excellent or suitable performance in each battery.

Figure 4:
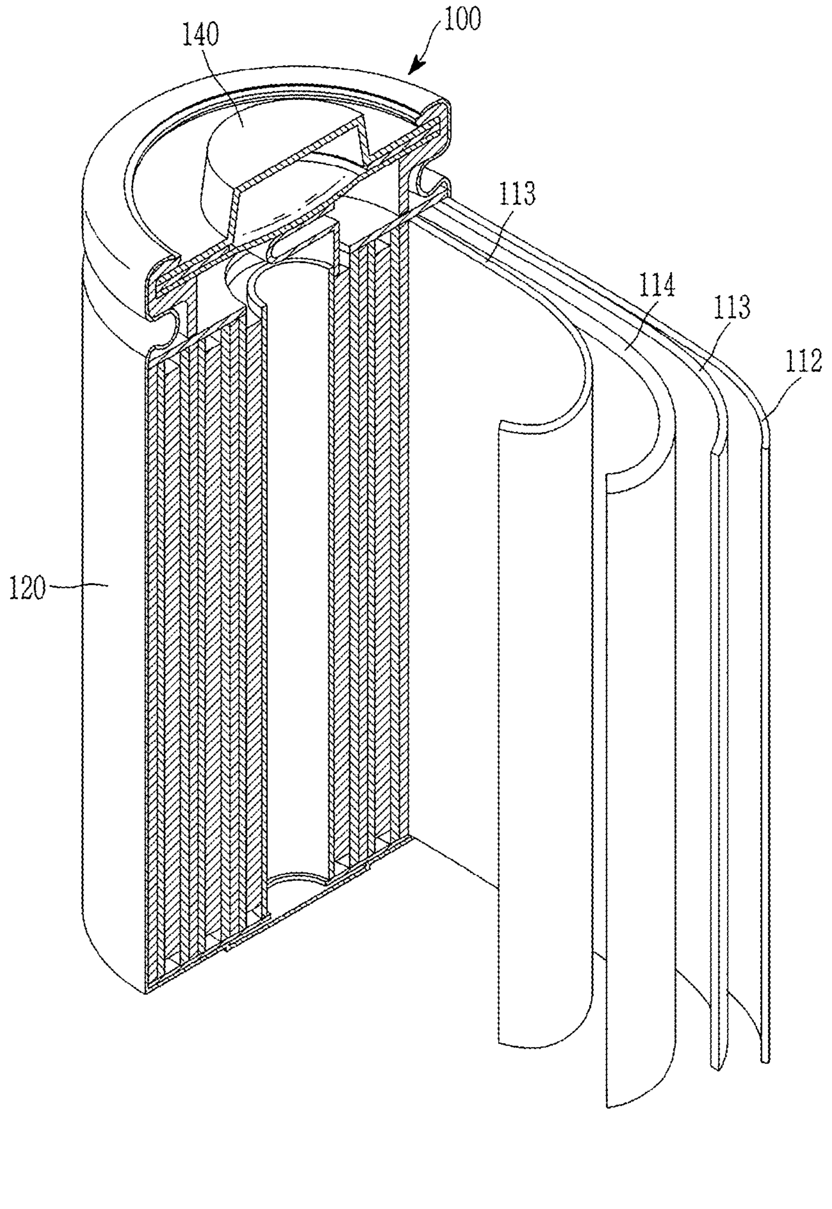
FIG. 4 is a schematic view illustrating a rechargeable lithium battery according to an embodiment.

As an example, a rechargeable lithium battery including a separator and a liquid electrolyte is described. FIG. 4 is a schematic view illustrating a rechargeable lithium battery according to an embodiment. Referring to FIG. 4, the rechargeable lithium battery 100 according to an embodiment includes a battery cell including a positive electrode 114, a negative electrode 112 facing the positive electrode 114, a separator 113 between the positive electrode 114 and the negative electrode 112, an electrolyte for a rechargeable lithium battery impregnating the positive electrode 114, the negative electrode 112, and the separator 113, a battery case 120 containing the battery cell, and a sealing member 140 sealing the battery case 120.

The electrolyte includes a non-aqueous organic solvent and a lithium salt.

The non-aqueous organic solvent serves as a medium for transporting ions taking part in the electrochemical reaction of a battery. The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like and the ketone-based solvent may include cyclohexanone, and/or the like. In some embodiments, the alcohol-based solvent may include ethanol, isopropyl alcohol, and/or the like and the aprotic solvent may include nitriles such as R—CN (wherein, R is a C2 to C20 linear, branched, or cyclic hydrocarbon group, and may include a double bond, an aromatic ring, or an ether bond), and/or the like, amides such as dimethyl formamide, and/or the like, dioxolanes such as 1,3-dioxolane, sulfolanes, and/or the like.

The non-aqueous organic solvent may be utilized alone or in a mixture. When the organic solvent is utilized in a mixture, the mixture ratio may be controlled or selected in accordance with a desirable battery performance.

In some embodiments, the carbonate-based solvent may include a mixture with a cyclic carbonate and a chain carbonate. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in the carbonate-based solvent. In this case, the carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by Chemical Formula I may be utilized.

Chemical Formula I

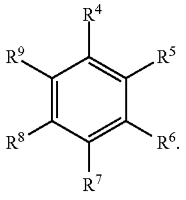

In Chemical Formula I, $R^4$ to $R^9$ may be the same or different and each independently selected from hydrogen, a halogen, a C1 to C10 alkyl group, a C1 to C10 haloalkyl group, and a combination thereof.

Non-limiting examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula II in order to improve cycle-life of a battery.

Chemical Formula II

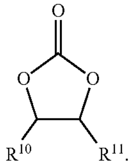

In Chemical Formula II, $R^{10}$ and $R^{11}$ may be the same or different, and each independently selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but $R^{10}$ and $R^{11}$ are not both (e.g., simultaneously) hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be utilized within an appropriate or suitable range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example, an integer in a range of 1 to 20), lithium difluoro (bisoxalato) phosphate, LiCl, LiI, $LiB(C_2O_4)_2$ (lithium bis (oxalato) borate, LiBOB), and/or lithium difluoro(oxalato) borate (LiDFOB).

The lithium salt may be utilized in a concentration in a range of about 0.1 M to about 2.0 M. When the lithium salt is included at the above concentration range, an electrolyte may have excellent or suitable performance and lithium ion mobility due to optimal or suitable electrolyte conductivity and viscosity.

The separator 113 separates a positive electrode 114 from a negative electrode 112 and provides a transporting passage for lithium ions and may be any generally-utilized separator in a lithium ion battery. That is, it may have low resistance to ion transportation and excellent or suitable impregnation for an electrolyte. For example, the separator 113 may include glass fiber, polyester, polyethylene, polypropylene, polytetrafluoroethylene, or a combination thereof, and may be in the form of a non-woven fabric or a woven fabric. For example, in a lithium ion battery, a polyolefin-based polymer separator such as polyethylene and polypropylene may be mainly utilized. In order to ensure the heat resistance or mechanical strength, a coated separator including a ceramic component or a polymer material may be utilized. Optionally, it may have a mono-layered or multi-layered structure.

Rechargeable lithium batteries may be classified as lithium ion batteries, lithium ion polymer batteries, and lithium polymer batteries according to the presence of a separator and the kind of electrolyte utilized therein. The rechargeable lithium batteries may have a variety of suitable shapes and sizes, and may include cylindrical, prismatic, coin, or pouch-type or kind batteries, and may be thin film batteries or may be rather bulky in size. Structures and manufacturing methods for lithium ion batteries pertaining to this disclosure are well known in the art.

The rechargeable lithium battery according to an embodiment may be utilized in an electric vehicle (EV), a hybrid electric vehicle such as a plug-in hybrid electric vehicle (PHEV), and/or a portable electronic device because it implements a high capacity and has excellent or suitable storage stability, cycle-life characteristics, and high rate characteristics at high temperatures.

Hereinafter, examples of the present disclosure and comparative examples are described. It is to be understood, however, that the examples are for the purpose of illustration and are not to be construed as limiting the present disclosure.

EXAMPLE

1. Preparation of Positive Electrode Active Material Precursor

In the following co-precipitation method, nickel sulfate, cobalt sulfate, and aluminum nitrate were utilized as metal raw materials.

[First Step (e.g., Act or Task): 2.5 $kW/m^3$, $NH_4OH$ 0.40 M, pH 10.5 to 11.5, and Reaction Time of 6 Hours]

First, ammonia water having a concentration of 0.40 M was put in a reactor. While metal raw materials and a complexing agent ($NH_4OH$) were added thereto respectively at 85 mL/min and 10 mL/min at 50° C. under a stirring power of 2.5 $kW/m^3$, the reaction was started.

While NaOH was added thereto to maintain pH, the reaction was performed for 6 hours. As a result of the reaction, it was confirmed that the average sizes of the obtained particles (e.g., core particles) were in the range of about 6.5 μm to 7.5 μm, and the second step was performed as follows.

[Second Step: 2.0 $kW/m^3$, $NH_4OH$ 0.45 M, pH 10.5 to 11.5, and Reaction Time of 18 Hours]

The metal raw materials and the complexing agent were added thereto respectively at 107 mL/min and 15 mL/min, so that a concentration of the complexing agent was maintained to be 0.45 M, while the reaction temperature was maintained at 50° C. While adding NaOH thereto in order to maintain pH, the reaction was performed for 18 hours. At the end of this time, the stirring power was lowered to 2.0 $kW/m^3$, which was lower than the first step, and the reaction proceeded. By performing this reaction, it was confirmed that the average size of the product particles (e.g., containing the core and the intermediate layer) were 11.5 μm to 12 μm, and the third step was performed as follows.

[Third Step: 1.0 $kW/m^3$, $NH_4OH$ 0.45 M, pH 10.5 to 11.5, and Reaction Time of 10 Hours]

While maintaining the reaction temperature at 50° C., the metal raw material and the complexing agent were added at the rates of 142 mL/min and 19 mL/min, respectively, so that the concentration of the complexing agent was maintained the same as in the second step. While adding NaOH thereto in order to maintain pH, the reaction was performed for 10 hours. At the end of this time, the stirring power was lowered to 1.0 $kW/m^3$, which was lower than in the second step, and the reaction proceeded.

[Post-Process]

After washing the resultant product, the washed resultant product was dried with hot air at about 150° C. for 24 hours to obtain nickel-based hydroxide ($Ni_{0.945}Co_{0.04}Al_{0.015}(OH)_2$), which was a positive electrode active material precursor.

2. Preparation of Positive Electrode Active Material 100 parts by mole of LiOH was mixed with 100 moles of the obtained nickel-based composite hydroxide, a temperature was raised to 700° C. for 8 hours in an oxygen atmosphere, and heat-treatment was performed for 7 hours to prepare a final positive electrode active material, a nickel-based composite oxide ($LiNi_{0.945}Co_{0.04}Al_{0.015}O_2$).

As such, it was confirmed that the final positive electrode active material prepared in Example was in a form of a secondary particle including an inner portion having an irregular porous structure and an outer portion having a radially arranged structure, and the peak full width at half maximum (FWHM) of the (003) plane in X-ray diffraction analysis was 0.1208.

3. Manufacture of Positive Electrode 96 wt % of the obtained positive electrode active material, 2 wt % of polyvinylidene fluoride, 2 wt % of carbon nanotube, and N-methylpyrrolidone as a solvent were mixed in a mixer to prepare slurry for a positive electrode active material layer. The slurry was coated on an aluminum foil into an electrode plate and then, dried at 135° C. for at least 3 hours, roll-pressed, and vacuum-dried, thereby manufacturing a positive electrode.

4. Manufacture of Battery Cell

The positive electrode and a lithium metal counter electrode were utilized to manufacture a coin half-cell. Between the positive electrode and the lithium metal counter electrode, a separator formed of a porous polyethylene film (thickness: about 16 μm) was interposed, and an electrolyte solution was injected thereinto. The electrolyte solution was prepared by mixing ethylene carbonate (EC) and ethylmethyl carbonate (EMC) in a volume ratio of 3:5 and dissolving 1.1 M $LiPF_6$ in the mixed solvent.

Comparative Example 1

1. Preparation of Positive Electrode Active Material Precursor

Nickel sulfate, cobalt sulfate, and aluminum nitrate were dissolved in distilled water at a mole ratio of 94.5:4:1.5 to prepare a metal raw material mixed solution. A dilute ammonia ($NH_4OH$) water solution and sodium hydroxide (NaOH) as a precipitant were prepared to form a complex compound.

After adding the dilute ammonia water solution to the continuous reactor, the metal raw material mixed solution was continuously added, and sodium hydroxide was added to maintain the pH inside the reactor. The reaction proceeded slowly for about 80 hours, and when the reaction was stabilized, the product that overflowed was collected and the drying process proceeded.

Accordingly, a nickel-based composite hydroxide ($Ni_{0.945}Co_{0.04}Al_{0.015}(OH)_2$) in the form of a secondary particle in which primary particles were aggregated was prepared.

2. Preparation of Positive Electrode Active Material 100 parts by mole of LiOH was mixed with 100 moles of the obtained nickel-based composite hydroxide, a temperature was raised to 700° C. for 8 hours in an oxygen atmosphere, and heat-treatment was performed for 7 hours to prepare a radial-type or kind nickel-based composite oxide, $LiNi_{0.945}Co_{0.04}Al_{0.015}O_2$.

In the X-ray diffraction analysis of the positive electrode active material obtained in Comparative Example 1, the peak full width at half maximum (FWHM) of the (003) plane was confirmed to be 0.1292. The positive electrode active material of Comparative Example 1 has a radial structure and a peak full width at half maximum (FWHM) of the (003) plane exceeds 0.125. The ratio of large primary particles in the positive electrode active material obtained in Comparative Example 1 was also large.

Thereafter, a positive electrode and a battery cell were manufactured in substantially the same manner as in Example.

Comparative Example 2

1. Preparation of Positive Electrode Active Material Precursor

In the following co-precipitation method, nickel sulfate, cobalt sulfate, and aluminum nitrate were utilized as metal raw materials.

[First Step: 2.5 kW/$m^3$, $NH_4OH$ 0.35 M, pH 10.5 to 11.5, and Reaction Time of 6 Hours]

First, ammonia water having a concentration of 0.35 M was put in a reactor. While metal raw materials and a complexing agent were added thereto respectively at 85 mL/min and 9 mL/min at 50° C. under a stirring power of 2.5 kW/$m^3$, a reaction was started. While NaOH was added thereto to maintain pH, the reaction was performed for 6 hours. As a result of the reaction, it was confirmed that the average sizes of the obtained particles (e.g., core particles) were in the range of about 5.5 μm to 6.5 μm, and the second step was performed as follows.

[Second Step: 1.5 kW/$m^3$, $NH_4OH$ 0.45 M, pH 10.5 to 11.5, and Reaction Time of 18 Hours]

The metal raw materials and the complexing agent were added thereto respectively at 107 mL/min and 15 mL/min, so that the complexing agent adjusted a concentration of 0.45 M, while the reaction temperature was maintained at 50° C. While adding NaOH thereto in order to maintain pH, the reaction was performed for 18 hours. At the end of this time, the stirring power was lowered to 1.5 kW/$m^3$, which was lower than the first step, and the reaction proceeded. By performing this reaction, it was confirmed that the average sizes of the product particles (e.g., containing the core and the intermediate layer) were 11.5 μm to 12 μm, and the third step was performed as follows.

[Third Step: 1.0 kW/$m^3$, $NH_4OH$ 0.45 M, pH 10.5 to 11.5, and Reaction Time of 10 Hours]

While maintaining the reaction temperature at 50° C., the metal raw material and the complexing agent were added at the rates of 142 mL/min and 19 mL/min, respectively, so that the concentration of the complexing agent was maintained the same as in the second step. While adding NaOH thereto in order to maintain pH, the reaction was performed for 10 hours. At this time, the stirring power was lowered to 1.0 kW/$m^3$, which was lower than in the second step, and the reaction proceeded.

Post-Process

After washing the resultant product, the washed resultant product was dried with hot air at about 150° C. for 24 hours to obtain nickel-based hydroxide ($Ni_{0.945}Co_{0.04}Al_{0.015}(OH)_2$), which was the positive electrode active material precursor.

2. Preparation of Positive Electrode Active Material

In the preparation of the positive electrode active material, a positive electrode active material precursor, a positive electrode active material, a positive electrode, and a battery cell were prepared according to the same method as in Example, except that the nickel-based composite hydroxide (i.e., the positive electrode active material precursor obtained above) and LiOH were mixed, then the temperature was raised to 700° C. for 5 hours, and heat-treatment was performed for 10 hours.

In the X-ray diffraction analysis of the positive electrode active material obtained in Comparative Example 2, the peak full width at half maximum (FWHM) of the (003) plane was confirmed to be 0.136. The positive electrode active material of Comparative Example 2 has a radial structure and a peak full width at half maximum (FWHM) of the (003) plane exceeds 0.125. The ratio of large primary particles in the positive electrode active material obtained in Comparative Example 2 was also small.

Comparative Example 3

1. Preparation of Positive Electrode Active Material Precursor

Nickel sulfate, cobalt sulfate, and aluminum nitrate were dissolved in distilled water at a mole ratio of 94.5:4:1.5 to prepare a metal raw material mixed solution. A dilute ammonia ($NH_4OH$) water solution and sodium hydroxide (NaOH) as a precipitant were prepared to form a complex compound.

After adding the dilute ammonia water solution to the continuous reactor, the metal raw material mixed solution was continuously added, and sodium hydroxide was added to maintain the pH inside the reactor. The reaction proceeded slowly for about 80 hours, and when the reaction was stabilized, the product that overflowed was collected and the drying process proceeded.

Accordingly, a nickel-based composite hydroxide ($Ni_{0.945}Co_{0.04}Al_{0.015}(OH)_2$) in a form of a secondary particle in which primary particles were not radially arranged was prepared.

2. Preparation of Positive Electrode Active Material 100 parts by mole of LiOH was mixed with 100 moles of the obtained nickel-based composite hydroxide, a temperature was raised to 700° C. for 5 hours in an oxygen atmosphere, and heat-treatment was performed for 10 hours to prepare a non-radial nickel-based composite oxide, $LiNi_{0.945}Co_{0.04}Al_{0.015}O_2$.

In the X-ray diffraction analysis of the positive electrode active material obtained in Comparative Example 3, the peak full width at half maximum (FWHM) of the (003) plane was confirmed to be 0.125. For example, the positive electrode active material of Comparative Example 3 has a peak full width at half maximum (FWHM) of 0.125 or less, but has a non-radial structure.

Thereafter, a positive electrode and a battery cell were manufactured in substantially the same manner as in Example.

Figure 5:
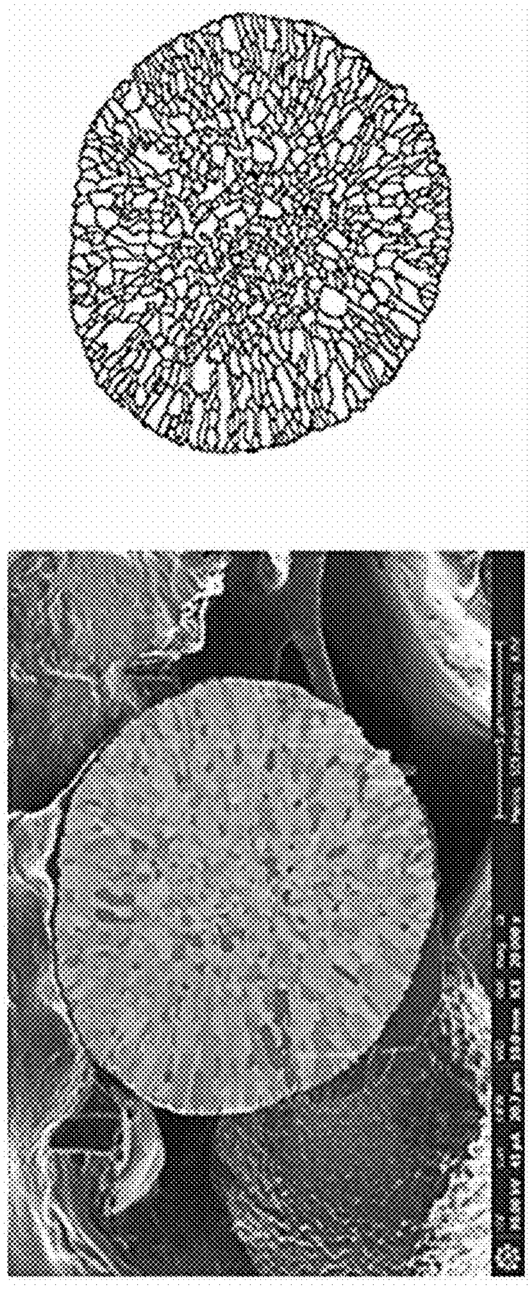
FIG. 5 is a scanning electron microscope (SEM) image of a cross-section of the positive electrode active material according to Example, which is cut with a focused ion beam (FIB), and an image of the primary particles contour-processed with an image processing program.
Figure 6:
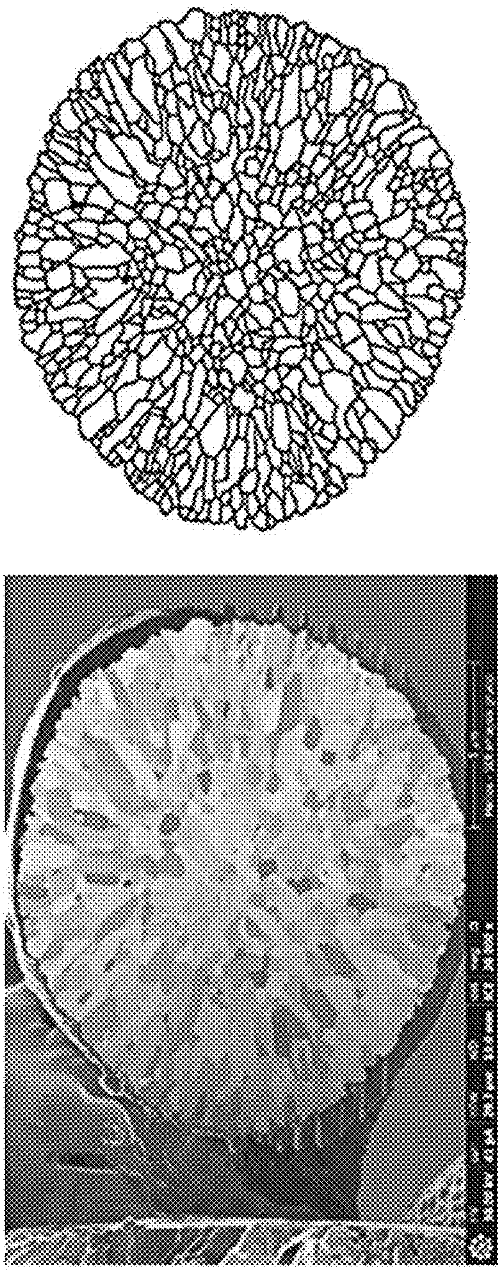
FIG. 6 is an SEM image of a cross-section of the positive electrode active material according to Comparative Example, which is cut with the FIB, and an image of the contour-processed primary particles.

Experimental Example 1: Analysis of Cross-Section of Positive Electrode Active Material FIG. 5 is a scanning electron microscope (SEM) image of a cross-section of the positive electrode active material according to Example, which was cut with a focused ion beam (FIB), and an image obtained by inputting the SEM image to a computer and contouring the primary particles with an Image J program. FIG. 6 is a cross-section SEM image of the positive electrode active material of Comparative Example 1 and an image obtained by contour-processing the primary particles, and FIG. 7 is a cross-section SEM image of the positive electrode active material of Comparative Example 2 and an image obtained by contour-processing the primary particle.

Figure 7:
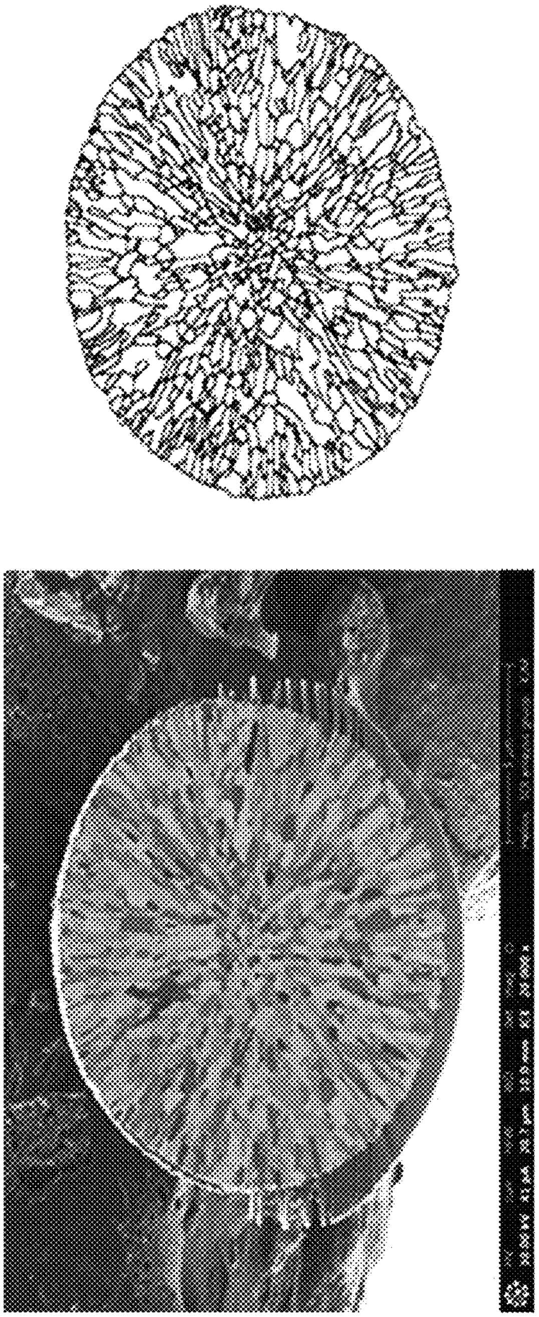
FIG. 7 is an SEM image of a cross-section of the positive electrode active material according to Comparative Example 2, which is cut with the FIB, and an image of the contour-processed primary particles.

Referring to FIGS. 5 to 7, the positive electrode active material of Example form secondary particles including (e.g., each including) an inner portion having an irregular porous structure and an outer portion having a radial structure; in the positive electrode active material of Comparative Example 1, a portion of the primary particles are radially arranged, but there are many large primary particles; and in the positive electrode active material of Comparative Example 2, a portion of the primary particles are radially arranged, but in the inner portion, pores were not developed.

Figure 8:
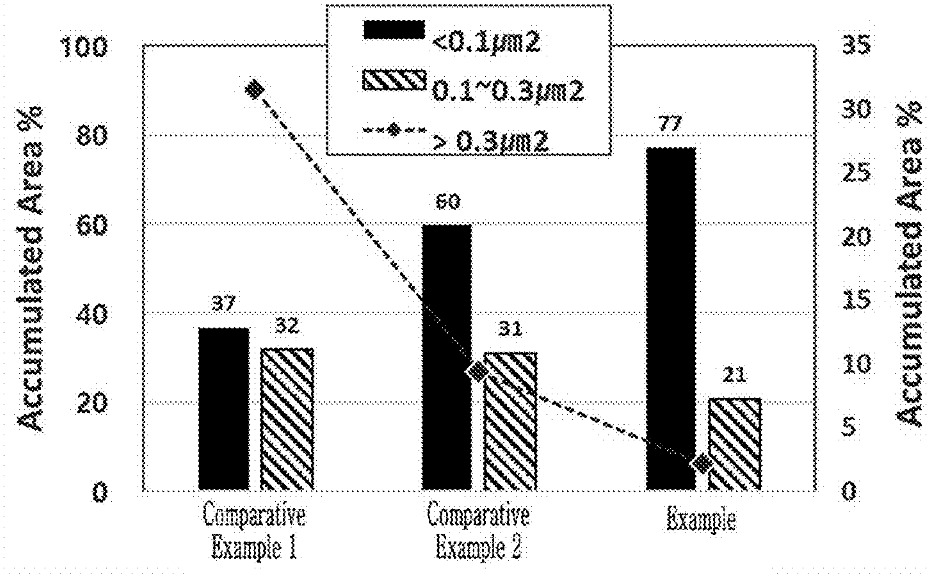
FIG. 8 is a graph analyzing distributions of cross-sectional areas of the primary particles on the cross-sections of the secondary particles of the positive electrode active materials according to Example and Comparative Examples 1 and 2.

Experimental Example 2: Analysis of Area Distribution of Cross-Section of Primary Particles The positive electrode active materials according to Example and Comparative Examples 1 and 2 were measured regarding a cross-sectional area distribution of primary particles by contour-processing the primary particles in the FIB cross-section SEM images, as shown in FIGS. 5 to 7, and measuring cross-sectional areas of the primary particles with an Image J program. FIG. 8 is a graph analyzing the distribution of the cross-sectional areas of the primary particles, wherein a black bar graph represents a ratio of the number of primary particles having a cross-sectional area of smaller than 0.1 $\mu m^2$, a hatched bar graph represents a ratio of the number of primary particles having a cross-sectional area of 0.1 $\mu m^2$ to 0.3 $\mu m^2$, and a dotted line graph represents a ratio of the number of large primary particles having a cross-sectional area of larger than 0.3 $\mu m^2$.

Referring to FIG. 8, the ratio of the number of primary particles having a cross-sectional area of less than 0.1 $\mu m^2$ was 37% in Comparative Example 1 and 60% in Comparative Example 2 but 77% in Example, which was much higher than the comparative examples and satisfies greater than or equal to 65%. In addition, the ratio of the number of primary particles having a cross-sectional area of greater than 0.3 $\mu m^2$ was about 33% in Comparative Example 1 and about 10% in Comparative Example 2 but about 2% in Example, which was much lower than the comparative examples.

Figure 9:
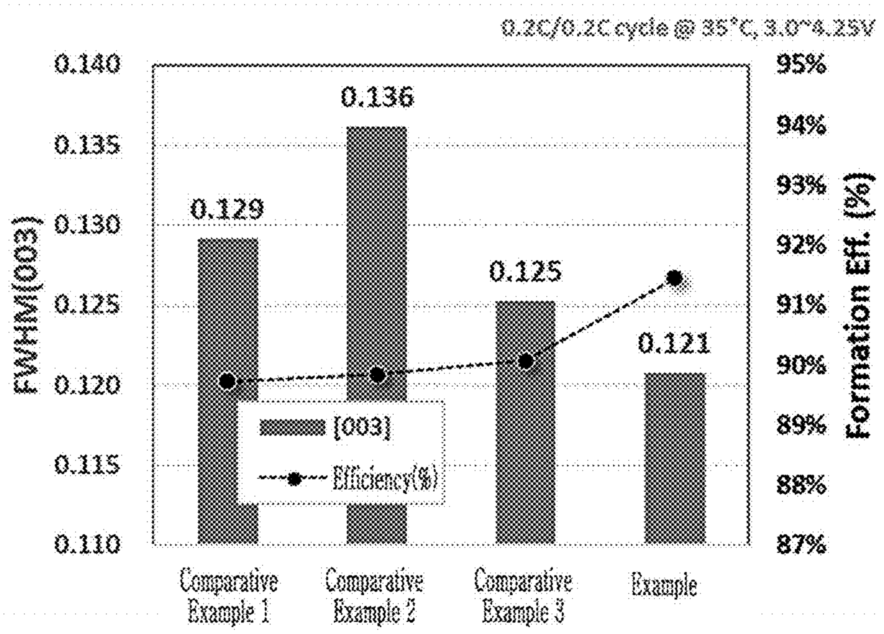
FIG. 9 is a graph showing a full width at half maximum of the (003) plane peak ($FWHM_{003}$) in the X-ray diffraction analysis and initial charge/discharge efficiency of the positive electrode active materials of Example and Comparative Examples 1 to 3.

Experimental Example 3: Analysis of Peak Full Width at Half Maximum (FWHM) of (003) Plane in XRD X-ray diffraction analysis was performed on the positive electrode active materials according to Example and Comparative Examples 1 to 3 to take a peak full width at half maximum (FWHM) of the (003) plane, and the results are shown in FIG. 9. In FIG. 9, the bar graph shows a peak full width at half maximum (FWHM) of the (003) plane, and the dotted line graph shows initial charge/discharge efficiency to be described later.

Referring to FIG. 9, Comparative Examples 1 and 2 each exhibits a peak full width at half maximum (FWHM) of the (003) plane of greater than 0.125, but Comparative Example 3 and Example each satisfies less than or equal to 0.125.

Evaluation Example 1: Lithium Ion Diffusion Distance and Diffusion Coefficient For the positive electrode active materials according to Example and Comparative Examples 1 and 2, a log graph of a lithium ion diffusion coefficient ($D^{GITT}$) according to a charging voltage was derived by utilizing Galvanostatic Intermittent Titration Technique (GITT), and the results are shown in FIG. 10.

Figure 10:
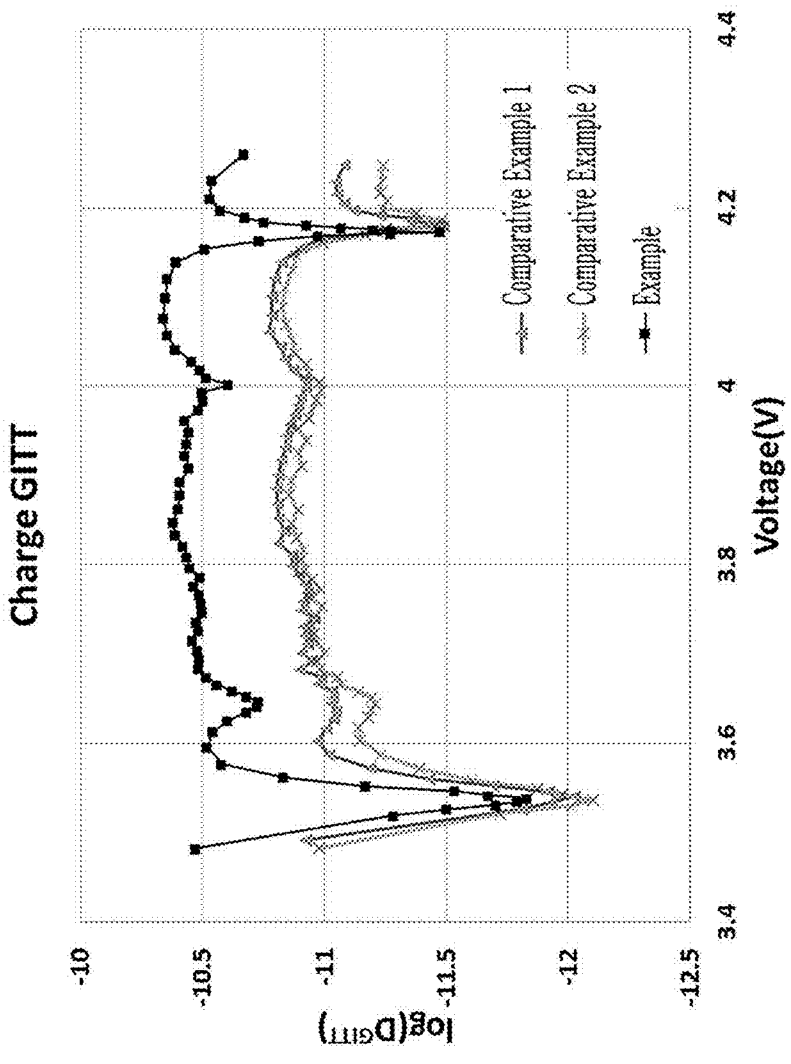
FIG. 10 is a log graph of a lithium ion diffusion coefficient ($D^{GITT}$) of the positive electrode active materials of Example and Comparative Examples 1 and 2 according to a voltage.

Referring to FIG. 10, Example exhibits a higher lithium ion diffusion coefficient than each of Comparative Examples 1 and 2, and thus, was advantageous for kinetically high-rate charging.

Evaluation Example 2: Evaluation of Initial Charge/Discharge Efficiency

Figure 11:
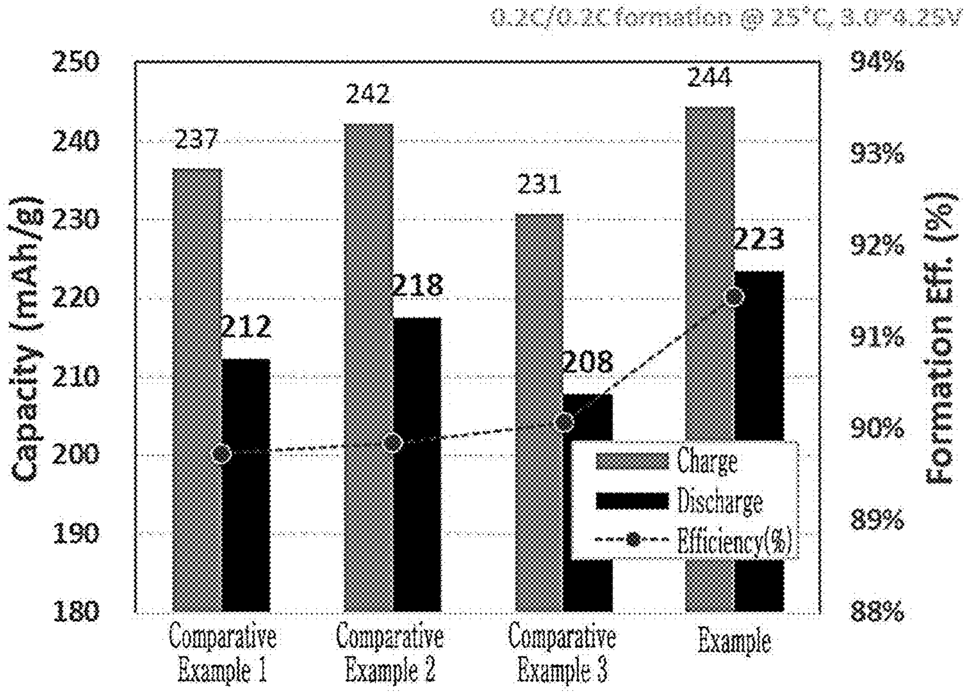
FIG. 11 is a graph showing initial charge capacity, initial discharge capacity, and initial charge/discharge efficiency of the battery cells of Example and Comparative Examples 1 to 3.

The battery cells according to Example and Comparative Example 1 to 3 were charged to an upper limit voltage of 4.25 V at a constant current of 0.2 C at 25° C. and discharged to a discharge cut-off voltage of 3.0 V at a constant current of 0.2 C to perform the initial charge and discharge. In FIG. 11, the bar graph exhibits initial charge capacity and initial discharge capacity, and the dotted line graph exhibits a ratio of the initial discharge capacity to the initial charge capacity, which was the initial efficiency (i.e., formation efficiency). In addition, the same initial efficiency (i.e., formation efficiency) was also additionally marked by a dotted line graph in FIG. 9.

Referring to FIG. 11, Example exhibits higher initial charge capacity and higher initial discharge capacity and much improved initial charge/discharge efficiency (i.e., formation efficiency), compared with the comparative examples. The positive electrode active material of Example has many primary particles having a radially-arranged structure, a small cross-sectional area, for example, a cross-sectional area of less than 0.1 $\mu m^2$ and concurrently (e.g., simultaneously), a very small peak full width at half maximum (FWHM) of the (003) plane of less than or equal to 0.125 and thus exhibits lower diffusion resistance of lithium ions, that is, a higher diffusion coefficient of lithium and thereby, improved initial charge and discharge capacity and higher initial charge/discharge efficiency. It can be seen that the diffusion resistance of lithium ions was lower, that is, the diffusion coefficient of lithium was increased, and thus the initial charge/discharge capacity and initial charge/discharge efficiency were improved.

Comparative Example 3 was a case of applying a positive electrode active material having a peak full width at half maximum (FWHM) of the (003) plane of 0.125 but not having the radial structure utilized in an embodiment, and referring to FIG. 11, the initial charge and discharge capacities were deteriorated, and the initial charge/discharge efficiency was also much deteriorated, compared with Example.

Evaluation Example 2: Evaluation of Charging Rate Characteristics

Figure 12:
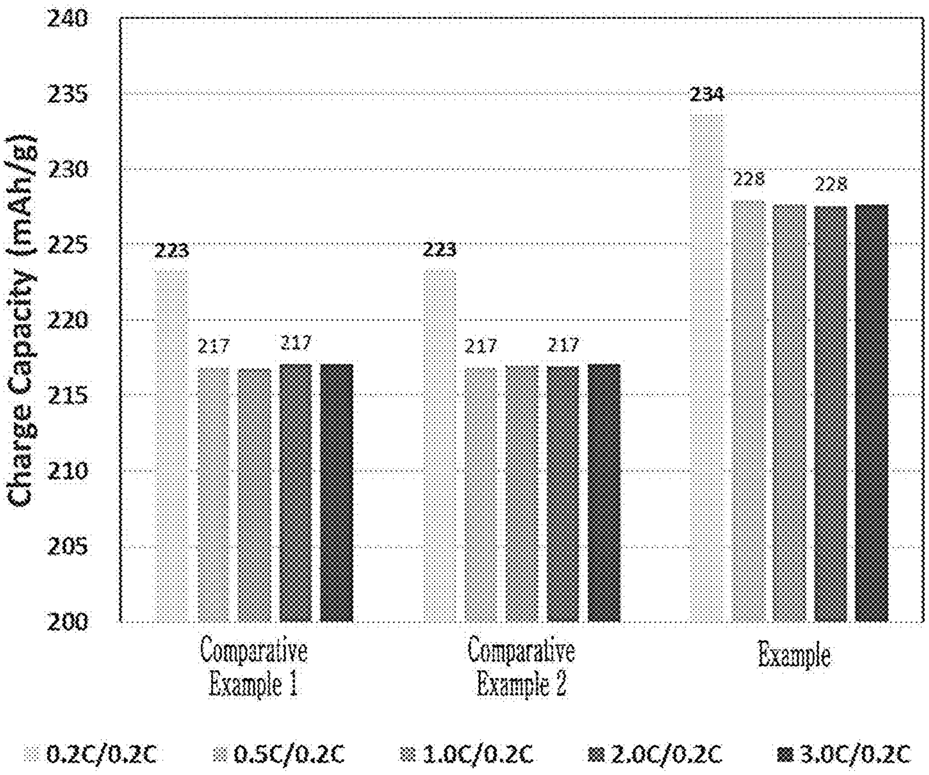
FIG. 12 is a graph showing charge capacity charged at 0.2 C, 0.5 C, 1.0 C, 2.0 C, and 3.0 C of the battery cells according to Example and Comparative Examples 1 and 2.
Figure 13:
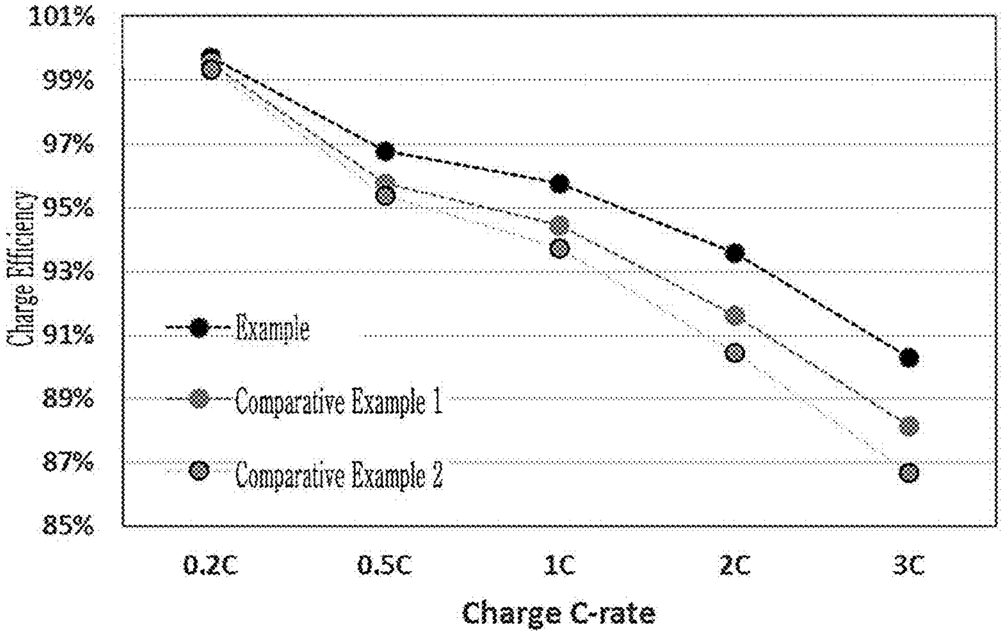
FIG. 13 is a graph showing charge efficiency of the battery cells of Example and Comparative Examples 1 and 2 according to a C-rate.

The battery cells according to Example and Comparative Examples 1 and 2 were constant current-charged to an upper limit voltage of 4.25 V at 25° C. and constant current-discharged to a cut-off voltage of 3.0 V at a constant current of 0.2 C, wherein charge capacity was measured at each C-rate set to 0.2 C, 0.5 C, 1.0 C, 2.0 C, and 3.0 C, and the results are shown in FIG. 12. In addition, a ratio of charge capacity at each C-rate to charge capacity after a constant current charge to an upper limit voltage of 4.25 V and a constant voltage charge to 0.05 C after at 25° C. was calculated and is shown in FIG. 13.

Referring to FIG. 12, Example exhibits higher charge capacity at all the C-rates than the comparative examples. Referring to FIG. 13, a charge capacity of Example was less reduced even when the charge rate was increased. In other words, Example exhibits the same capacity at a faster rate or higher capacity even when charged for the same time. Particularly, the improvement effect was much greater at high rates of 2 C and 3 C.

As the positive electrode active material of Example has primary particles having a radial structure of which many are small particles with a cross-sectional area of less than 0.1 $\mu m^2$ and exhibits a very small peak full width at half maximum (FWHM) of the (003) plane of less than or equal to 0.125, a lithium ion diffusion coefficient was increased, and a high-rate charge capacity and a charge rate as well as an initial charge/discharge efficiency were improved.

As used herein, the term "and/or" includes any and all combinations of one or more of the associated listed items. Throughout the disclosure, the expression, such as "at least one of a, b or c", "at least one selected from a, b, and c", "at least one selected from the group consisting of a, b, and c", etc., indicates only a, only b, only c, both (e.g., simultaneously) a and b, both (e.g., simultaneously) a and c, both (e.g., simultaneously) b and c, all of a, b, and c, or variation(s) thereof.

As used herein, the singular forms "a," "an," and "the" are intended to include the plural forms as well, unless the context clearly indicates otherwise. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although preferred embodiments have been described in more detail above, the scope of the present disclosure is not limited thereto. In addition, it should be understood that one or more suitable modifications and improvements by those skilled in the art utilizing the basic concept defined in the claims also fall within the scope of the present disclosure.

| Description of Symbols | |
|---|---|
| 11: secondary particle | 12: inner portion of secondary particle |
| 13: primary particle | 14: outer portion of secondary particle |
| 100: rechargeable lithium battery | 112: negative electrode |
| 113: separator | 114: positive electrode |
| 120: battery case | 140: sealing member |

What is claimed is:

1. A positive electrode active material for a rechargeable lithium battery, the positive electrode active material comprising: a lithium nickel-based composite oxide, wherein the positive electrode active material comprises a secondary particle in which a plurality of primary particles are aggregated and at least a portion of the primary particles are radially arranged, in a cross-section of the secondary particle, a number ratio of the primary particles having a cross-sectional area of less than about 0.1 $\mu m^2$ to a total number of the primary particles is greater than or equal to about 65%, calculated from a scanning electron microscope image, and a full width at half maximum (FWHM) of a peak corresponding to the (003) plane in an X-ray diffraction analysis for the positive electrode active material is less than or equal to 0.125.

2. The positive electrode active material of claim 1, wherein in the cross-section of the secondary particle, the number ratio of the primary particles having a cross-sectional area of less than about 0.1 $\mu m^2$ is about 65% to about 90%.

3. The positive electrode active material of claim 1, wherein in the cross-section of the secondary particle, a number ratio of the primary particles having a cross-sectional area of greater than about 0.3 $\mu m^2$ is less than or equal to about 5%, based on the total number of the primary particles.

4. The positive electrode active material of claim 1, wherein in the cross-section of the secondary particle, a number ratio of the primary particles having a cross-sectional area of about 0.1 $\mu m^2$ to about 0.3 $\mu m^2$ is about 5% to about 30%, based on the total number of the primary particles.

5. The positive electrode active material of claim 1, wherein the full width at half maximum of the peak corresponding to the (003) plane in the X-ray diffraction analysis for the positive electrode active material is about 0.100 to 0.125.

6. The positive electrode active material of claim 1, wherein the secondary particle comprises an inner portion in which primary particles and pores are irregularly arranged, and an outer portion in which at least a portion of the primary particles are radially arranged, and wherein the outer portion is a region around the inner portion.

7. The positive electrode active material of claim 1, wherein an average particle diameter (D50) of secondary particles in the positive electrode active material is about 5 μm to about 20 μm.

8. The positive electrode active material of claim 1, wherein the lithium nickel-based composite oxide is represented by Chemical Formula 1:

$$Li_{a1}Ni_{x1}M^1_{y1}M^2_{1-x1-y1}O_{2-z}X_z \quad \text{Chemical Formula 1}$$

wherein, in Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ are each independently at least one element selected from Al, B, Ba, Ca, Ce, Co, Cr, Fe, Mg, Mn, Mo, Nb, Si, Sr, Ti, V, W, and Zr, and X is at least one element selected from F, P, and S.

9. A positive electrode for a rechargeable lithium battery, the positive electrode comprising:

the positive electrode active material of claim 1; and a current collector supporting the positive electrode active material.

10. A rechargeable lithium battery, comprising a positive electrode comprising the positive electrode active material of claim 1, a negative electrode, and an electrolyte.

11. The positive electrode active material of claim 1, wherein in the cross-section of the secondary particle, a number ratio of the primary particles having a cross-sectional area of greater than about 0.3 $\mu m^2$ is 0.1% to about 5%, based on the total number of the primary particles.

12. The positive electrode active material of claim 1, wherein the positive electrode active material comprises a core, an intermediate layer and a shell.

13. The positive electrode active material of claim 12, wherein the positive electrode active material is produced through a three-step co-precipitation reaction in which one or more selected from a concentration of a complexing agent, an input rate of a composite metal raw material, a pH range, a reaction temperature, a reaction time, and a stirring power are differently adjusted for each step.

* * * * *